US006941482B2

(12) United States Patent
Strong (10) Patent No.: US 6,941,482 B2
(45) Date of Patent: Sep. 6, 2005

(54) SYSTEMS AND METHODS FOR SYNCHRONIZING TIME STAMPS

(75) Inventor: Stephen Strong, Fremont, CA (US)

(73) Assignee: Finisar Corporation, Sunnyvale, CA (US)

(*) Notice: Subject to any disclaimer, the term of this patent is extended or adjusted under 35 U.S.C. 154(b) by 533 days.

(21) Appl. No.: 10/238,358

(22) Filed: Sep. 10, 2002

(65) Prior Publication Data
US 2004/0049706 A1 Mar. 11, 2004

(51) Int. Cl.[7] .................................. G06F 15/173
(52) U.S. Cl. .................. 713/400; 714/712; 714/45; 714/37; 713/178; 439/701; 370/253; 370/252
(58) Field of Search .................. 713/400, 178; 714/712, 45, 37; 439/701; 370/252, 253

(56) References Cited

U.S. PATENT DOCUMENTS

| | | | | |
|---|---|---|---|---|
| 5,027,297 A | * | 6/1991 | Garitty et al. | ............... 702/187 |
| 5,590,116 A | * | 12/1996 | Zhang | .......................... 370/253 |
| 5,696,701 A | | 12/1997 | Burgess et al. | |
| 5,761,424 A | | 6/1998 | Adams et al. | |
| 5,812,529 A | | 9/1998 | Czarnik et al. | |
| 5,912,701 A | * | 6/1999 | Morton, Jr. | .................. 348/192 |
| 6,049,545 A | * | 4/2000 | Stephenson et al. | ........ 370/410 |
| 6,058,116 A | * | 5/2000 | Hiscock et al. | ............. 370/401 |
| 6,098,157 A | | 8/2000 | Hsu et al. | |
| 6,243,834 B1 | * | 6/2001 | Garrett | ......................... 714/37 |
| 6,335,931 B1 | | 1/2002 | Strong et al. | |
| 6,507,923 B1 | * | 1/2003 | Wall et al. | ................... 714/712 |
| 6,636,518 B1 | * | 10/2003 | Liencres | .................. 370/395.7 |
| 6,639,957 B2 | * | 10/2003 | Cahill-O'Brien et al. | ... 375/354 |
| 6,654,356 B1 | * | 11/2003 | Eidson et al. | ............... 370/303 |
| 6,789,182 B1 | * | 9/2004 | Brothers et al. | .............. 712/30 |
| 6,793,539 B1 | * | 9/2004 | Lee et al. | .................... 439/701 |

FOREIGN PATENT DOCUMENTS

| | | | | |
|---|---|---|---|---|
| GB | | 0726664 A2 | * 8/1996 | ........... H04L/12/26 |
| WO | WO 01/052400 A1 | | 7/2002 | |

OTHER PUBLICATIONS

Web page: Outstanding PC, Webopedia, *Routing in the Internet.*
Web page: Internetweek.com, Schultz, Keith, *A Complete Solution, Enterasys Networks proves its mettle in enterprise–class switching,* Jan. 22, 2001.
Web page: Marvell Press Release, *Galileo Announces New High–Performance 240–port Ethernet Switch Reference Design,* 1999.

* cited by examiner

*Primary Examiner*—A. Elamin
(74) *Attorney, Agent, or Firm*—Workman Nydegger (57) ABSTRACT

Systems and methods for synchronizing time stamp counters of ports in a domain and for starting, stopping and triggering the ports in the domain at substantially the same time. A master box is connected with at least one slave box and the ports on the connected boxes are logically grouped in domains. The master box generates a clock signal that is adjusted and distributed to the slave boxes. The clock signal thus received by the slave boxes drives a clock multiplier that in turn drives the time stamp counters of the ports in the domains across the respective boxes. The time stamps of ports within a domain are synchronized because they are driven by the clock signal from the master box. The ports in a particular domain can be started, stopped and triggered using control signals that are similarly distributed from the master box to the slave boxes.

22 Claims, 4 Drawing Sheets

SYSTEMS AND METHODS FOR SYNCHRONIZING TIME STAMPS

BACKGROUND OF THE INVENTION

1. The Field of the Invention

The present invention relates to synchronizing time stamp counters of ports within a domain and to synchronizing start, stop and trigger signals to ports in the domain. More particularly, the present invention relates to systems and methods for synchronizing the time stamp counters of ports in a domain across different boxes and across different technologies or protocols.

2. Background and Relevant Art

Computer networks are ubiquitous today. Almost every home and business is connected to the Internet and many have their own internal networks. Not surprisingly, those internal networks are also connected with other computer networks. One of the primary advantages of computer networks is the ability to send data from one computer to another.

The task of routing data from one computer to another computer is not always a simple task. Usually, the data is routed from one computer or network to another computer or network using routers, switching networks, or other types of gateways. These gateways or switching networks often provide physical connections or ports to various networks.

The ports are often provided, for example, on a card that is often contained in a chassis with a common backplane or bus. The chassis is often mounted to a rack. The chassis is modular thereby allowing multiple chassis to be mounted to the rack. Each chassis supports a particular number of blades and each blade supports a particular number of ports. The number of blades supported by a particular box and the number of ports supported by a particular blade and the distance from one chassis to another is hardware dependent, but the present invention is not limited by hardware constraints. These chassis thus provide access to a large number of ports that can be used for various purposes.

It is often desirable to associate some of these ports into a single logical grouping or domain. For example, assume that the boxes provide a number of Ethernet ports. Data is often sent from one of the ports to another port. The user may want to know the time delay for data sent from one port through to another. The problem that arises in these situations, especially if the Ethernet ports are not tied to a common blade, backplane, or bus, is that the respective clocks are different and it is not possible to accurately correlate actions that occur at the ports because there is no common reference frame. This is particularly true in situations where the port technologies or port protocols differ or the ports are separated by some distance.

For example, creating a domain of ports where more than one port protocol is used makes it difficult to correlate the timing aspects of the ports. The clock signals or oscillators that drive the ports of different protocols in the domain are typically different. Some of the ports, for example, may be Ethernet ports while other ports on a different box or on the same box are Fibre Channel ports. In addition, each port may be driven by a different clock, frequency or other control signal.

Because of the inherent differences between ports, applications such as protocol analysis, debugging and other applications that relate events on the ports in a user-defined domain are difficult to correlate because no common timestamp can be established between the various ports. For instance, each port is typically associated with a time stamp counter that can produce time stamp values. Time stamp values are often used to analyze the data that was present on the ports when a particular event or condition is detected.

The primary problem is synchronizing the time stamp counters such that the time stamp values associated with various ports can be used to identify the data that was present on the ports at a given time or during a certain time interval and be used to measure the latency from one port to another and be used to control the domain of ports simultaneously creating one large virtual port with a common time stamp counter. This large virtual port that includes the physical ports in a user defined domain can be used to simultaneously monitor data and troubleshoot many interconnection issues between disparate devices (routers, switches, host computers, adapter cards, etc.) in a network that may be of different protocols (Fibre Channel, Ethernet, etc.) and may not be geographically co-located.

BRIEF SUMMARY OF THE INVENTION

These and other limitations are overcome by the present invention, which is directed to synchronizing ports that are in a domain and more particularly to synchronizing ports in a domain that is spread across different blades, chassis, backplanes, boxes, and/or protocols. The present invention is also directed to starting, stopping and triggering the ports at substantially the same time within a particular domain.

When a port in a domain is started, the time stamp counter for that port begins counting. When a port is stopped, the time stamp counter of that port stops counting. When a port is triggered, data at the port is captured and stored. One advantage of the present invention is the ability to start/stop/trigger ports and time stamp counter within a domain at substantially the same time. The present invention also extends to synchronizing ports in boxes that utilize different protocols or technologies.

The present invention enables a user to associate ports into one or more domains and enables the ports that belong to a particular domain to be monitored, started, stopped, and/or triggered. In one embodiment, the ports in a particular domain are of different technologies or protocols that have inherently different characteristics. Some of the ports, for example, may be Ethernet ports while other ports on a different box or on the same box are fibre channel ports.

Synchronizing the time stamp counters of the ports within a domain across different boxes begins by identifying a master box. The other boxes that have ports within the domain are slave boxes to the master box. The master and slave boxes are typically connected in a cascade fashion. The clock signals of the slave boxes are tri-stated or disabled such the clock signal generated by the master box is used to drive the time stamp counters of the ports in the master box and in the slave boxes. Thus, the boxes are connected such that control signals including the clock signal can be distributed from the master box to a slave box. Because the boxes are cascaded, the slave box connected with the master box distributes the appropriate signals to the subsequent slave box. Each slave box thus distributes the appropriate signals to the next slave box in the chain.

At each box, the clock signal from the master box is multiplied and the multiplied clock signal is used to drive the time stamp counters of the ports on the respective boxes. In order to ensure that the time stamp counters are substantially synchronized, the clock signal generated by the master box or received by a slave box is adjusted to account for delay that may have been introduced into the clock signal as it is distributed from one box to the next box. For example, the clock signal generated by the master box is set back by a determined amount before it is distributed to the slave box. Thus, the clock signal at the slave box and at the master box is synchronized. Because the clock signal from the master box is driving the clock multiplier, the time stamp counters that are subsequently driven by the clock multiplier are substantially synchronized.

The other control signals used to start, stop and trigger the ports of a particular domain are delivered to each box in a similar manner to ensure that the ports are started, stopped, and/or triggered at substantially the same time.

When a port in a domain triggers or detects a predetermined condition or event, the port generates a trigger out signal that is provided to the master box through the control signals. The master box then asserts the run/stop/trigger signal, which causes the remaining ports in the domain to stop at substantially the same time and perform post trigger events. In this manner, the ports within a domain are synchronized even when the ports are in different locations, technologies and/or protocols.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

In communication and computer networks, the communication or data transfer often occurs through ports. The need to have ports that can be connected with other ports has led to the development of boxes that support a certain number of blades, which each support a certain number of ports. When these boxes, for example, are mounted on a rack, a large number of ports are available.

One of the problems that occurs with these hardware arrangements is the need, for instance, to simultaneously monitor, analyze, and debug the data transfer that occurs through multiple ports that are bundled together in the same domain. While each box typically has an oscillator that generates a clock signal, different boxes and different technologies typically generate signals that are of different frequencies. Because of this and other differences, it is often difficult to identify what is happening at one port with what is happening at another port because not all of the time stamp counters of the ports within a domain are driven by the same clock signals and/or frequencies. As a result, there is no time correlation between the time stamp values stored in the respective time stamp counters of the ports within the domain.

For example, a certain network requires the connection of an Ethernet port on one box with a Fibre Channel port on another box. At the Ethernet port, a trigger event is detected that causes the Ethernet port and the Fibre Channel port to start collecting data when the event occurs. A user is often interested, for example, in determining the time delay of the data or the amount of time the data takes to travel one-way between the ports, or the time the data takes to travel one-way through a separate network device under test between the ports, or the time the data takes to travel one-way through the network (multiple devices) between the two ports. Because the time stamp counters of the Ethernet port and of the Fibre Channel port are not correlated, it is difficult to ascertain the time delay that occurs between ports in a domain. For the same reasons, it is difficult to correlate the data captured at the Ethernet port with the data captured by the Fibre Channel port. Thus, the data passing through the Fibre Channel port cannot be easily identified as the same data that is passing through the Ethernet port when the Ethernet port triggers.

The present invention extends to both methods and systems for synchronizing the time stamp counters on ports within a domain even when the ports support different technologies and/or protocols or are in distinct boxes, or in boxes that are in different locations. The present invention also extends to systems and methods for starting, stopping and triggering ports that are grouped together within a single domain. As a practical matter, the present invention is often tied to a particular hardware implementation. Any particular hardware configuration discussed herein is solely for illustrative purposes and the present invention is not limited to any specific hardware configuration. The embodiments of the present invention may comprise a special purpose or general-purpose computer including various computer hardware, as discussed in greater detail below.

In one exemplary hardware configuration, eight boxes are connected together in a cascaded fashion. Each box supports up to four blades and each blade can support up to eight ports. For illustration purposes, it is assumed that this configuration can support eight port domains. A domain refers to a group of ports that are bundled or connected together. Any port in any box can be in any one of the domains. Because the boxes or blades are not necessarily of the same technology, it is possible to have different types of ports within a single domain.

Each port is associated with a time stamp counter that generates time stamp values. Data passing through the ports is often stamped with the time stamp value obtained from the time stamp counters. One advantage of synchronizing the time stamp counters of ports in a domain is that troubleshooting is simplified because of the synchronized time reference that exists between the ports in the domain. Note that if each port in the domain relies solely on the clock of each box, as previously stated, it is difficult to determine when a particular port triggers from the perspective of another port because the time stamp counters of the ports are not related or synchronized.

Figure 1:
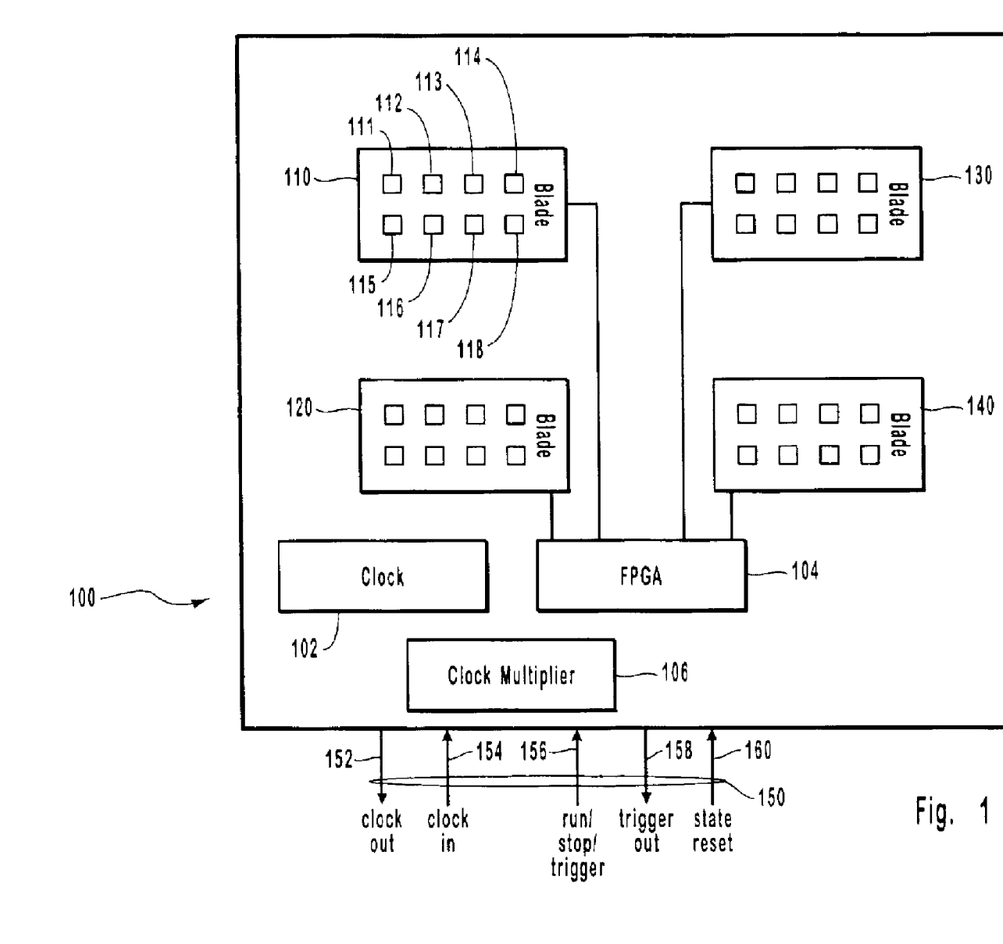
FIG. 1 illustrates an exemplary box that includes one or more blades that each support one or more ports.

FIG. 1 is a block diagram that illustrates an exemplary box 100. The box 100 includes four blades illustrated as blades 110, 120, 130, and 140. Each blade supports a plurality of ports (eight in this example). The blade 110, for example, includes or supports the ports 111, 112, 113, 114, 115, 116, 117, and 118. The other blades 120, 130, and 140 of the box 100 similarly include or support a number of ports.

The box 100 includes an oscillator or clock 102 that operates at a certain frequency. Because the ports can often support a high data rate, the clock signal of the clock 102 is multiplied by the clock multiplier 106 and the resulting clock signal of the clock multiplier is used to drive the time stamp counters of each port of each blade. Each time stamp counter of each port is thus driven by the multiplied clock signal generated by the clock multiplier 106. As described below in more detail, whether a particular time stamp counter is incrementing with the multiplied clock signal depends on the state of the particular port or on the status of another control signal.

The box 100 also includes a field programmable gate array (FPGA) 104 or other similar module. The FPGA 104 can be used, for example, to direct various signals to various ports. The FPGA 104 is used to program each port to a particular domain and to set the correct bits from the control signals to the appropriate port. The FPGA 104 can be programmed via another port from a processor, for example. The FPGA 104 also performs comparisons that are used to set bits on the port as will be described in more detail below.

Each port is connected with control signals. Exemplary control signals include, but are not limited to, a time stamp clock from the clock multiplier 106, a run/stop/trigger (RST) signal, a trigger out (TO) signal, and a state reset (SR) signal. The time stamp clock is driven through each blade to each port and drives a time stamp counter for each port. The present invention enables the time stamp clock to be synchronized for all blades and all boxes as will be described.

There is a RST signal for each port. In one embodiment, the RST signal is initially low. On the rising edge of the RST signal, the time stamp counter begins and the port is enabled to receive, monitor and/or transmit. On the falling edge of the RST signal, the port will trigger and perform any post trigger actions that are required, such as filling a buffer with data. There is also a TO signal for each port. Each port can generate a TO signal, which indicates that a trigger event or condition has occurred. In one example, the TO signal of a port is low when the RST signal for that port goes high. Each port also has a SR signal that causes the port to reset back to an initial or beginning state.

FIG. 1 further illustrates these control signals 150 in more detail. The control signals 150 include, but are not limited to, a clock out 152, a clock-in signal 154, a RST signal 156, a TO signal 158, and a SR signal 160. FIG. 1 further illustrates that the control signals 150, in addition as being specific to particular ports as described above, can also be distributed between boxes.

Figure 2:
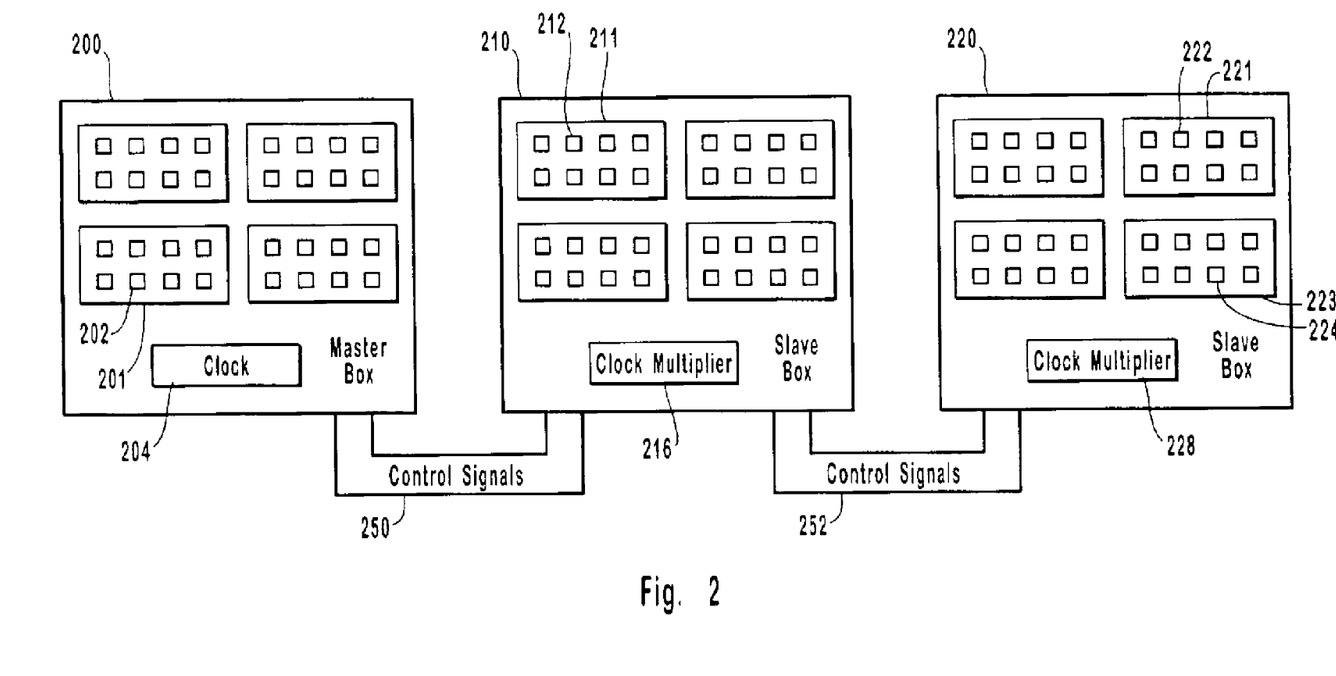
FIG. 2 is a block diagram that illustrates a master box that is cascaded with one or more slave boxes and illustrates the control signals that are distributed from box to box.

The clock out 152, for example, is typically generated by a master box and is sent to one or more slave boxes (as shown in FIG. 2). The clock out signal 152 is used to synchronize the time stamp counters of the ports in a particular domain. The clock signal 154 may refer to the clock signal that is received from a previous master or slave box (also shown in FIG. 2). The RST signal 156 is a signal that is used to start/stop/trigger the time stamp counters of ports within a domain of ports. The TO signal 158 is generated by a port that experiences a trigger event. After a trigger event occurs and the master box receives the TO signal 158, the RST 156 is used to stop other time stamp counters of ports in the domain where the TO signal 158 initiated.

In another embodiment, the RST signal 156 is implemented as two separate control signals. There is a run/stop signal and a trigger signal. These signals have the functions described herein but are implemented as separate signals. In this example, the time stamp counters will begin counting when the run/stop signal goes high (or low) and the time stamp counters will stop counting when the run/stop signal goes low (or high). The trigger signal will cause the port to trigger and perform trigger event functions when the trigger signal is asserted.

FIG. 2 is a block diagram that illustrates a series of boxes that are connected by cables. In one example, the cables connect to each box using RJ45 connectors. The cables carry the control signals from one box to the next. FIG. 2 illustrates boxes that are cascaded together, but the present invention is not limited to a cascaded configuration. The box 200 is connected with the box 210 by the cable 250 and the box 210 is connected to the box 220 by the cable 252. The boxes 200, 210 and 220 are not required to share a common bus or be co-located, and each box is typically capable of generating an independent clock signal. The clock signal of a slave box is typically disabled or tri-stated such that the clock signal generated and distributed from the master box may be used. For clarity, the clock of box 210 and box 220 are not shown to illustrate that the clock 204 of the master box 200 is being used for the time stamp counters of ports within the domain.

FIG. 2 also introduces a domain of ports. A domain includes one or more ports that may be selected from different blades and/or boxes. The domain illustrated in FIG. 2 includes the port 202 from a blade 201 of the box 200, a port 212 from a blade 211 of the box 210, a port 222 from the blade 221 of the box 220, and a port 224 from a blade 223 of the box 220.

The domain illustrated by FIG. 2 thus shares ports that are located on different blades of different boxes. Because the boxes do not share a common bus and because a domain can include ports from different boxes, the domain may include ports that use different technologies/protocols.

For a given domain, there is typically a master box, illustrated in FIG. 2 as box 200. Software can determine which boxes and/or ports are available to a network and connected. A determination is also made as to which box is the master box and which boxes are slave boxes. The master box 200 includes a clock 204 that is distributed to and used by the slave boxes (slave box 210 and slave box 220) that have ports included in a particular domain. The clock signal from the clock 204 of the master box 200 is delivered to the slave box 210 through the control signals 250. The slave box 210 delivers the clock signal to the slave box 220 through the control signals 252.

The clock multiplier 216 of the slave box 210 multiplies the clock signal from the master box 200 and it is the multiplied clock signal (also referred to herein as the time stamp clock) that drives the time stamp counters of the ports on the slave box 210. A clock multiplier at the master box 200 is used to drive the time stamp counters of the ports on the master box. The clock signal delivered to the box 220 is multiplied by the clock multiplier 228 and the multiplied clock signal from the clock multiplier drives the time stamp counters of the slave box 220. For example, if the clock signal from the clock 204 operates at 25 MHz and the clock multipliers multiply the clock signal by a factor of four, the time stamp counters are driven by a clock signal operating at 100 MHz.

Because the clock signal is delivered from the master box 200 to the slave box 210 and from the slave box 210 to the next slave box 220, it is possible that a delay will be introduced in the clock signal. For example, the length of the cable connecting two boxes can introduce a clock delay, the receiver can introduce a delay, and the line drivers can introduce a delay. If, for example, eight boxes are cascaded together, the time stamps on the last box may be different from the time stamps of the master box.

Figure 3:
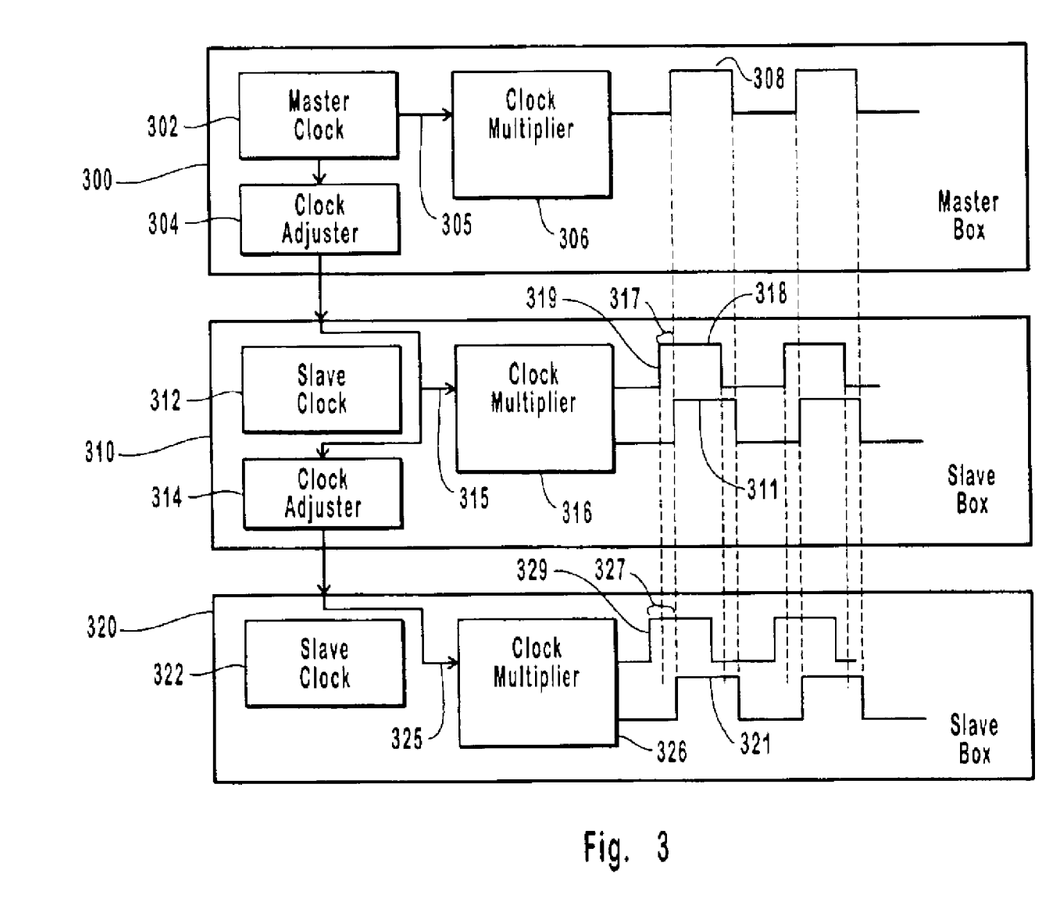
FIG. 3 illustrates how the clock signal and the other control signals are adjusted before being distributed to the next box.

FIG. 3 illustrates an example of how this delay can be reduced or eliminated. The master box 300 has a master clock 302 that generates a clock signal 305. The clock signal 305 drives the FPGA of the master box, the clock multiplier 306, and the clock adjuster 304. The clock signal 305 is multiplied by the clock multiplier 306 to generate a time stamp clock signal 308 that drives the time stamp counters for all ports on the master box 300. To account for any delay that may be introduced as the clock signal 305 is delivered to slave boxes, the master box 300 includes a clock adjuster 304 that adjusts the clock signal in order to account for this delay. In other words, the rising edge of the output of the clock adjuster 304 precedes the input by the expected delay (on the order of 8 nanoseconds in one example).

Thus, the slave box 310 receives a clock signal from the clock adjuster 304. The clock signal 315 generated at the slave box 310 is actually the clock signal received from the clock adjuster 304 of the master box 300. At the slave box 310, the clock signal 315 is multiplied by the clock multiplier 316 and distributed to the time stamp counters of the ports of the slave box 310. The clock signal 318 represents the clock signal distributed to the time stamp counters of the slave box 310 in the absence of the clock adjuster 304. The clock signal 318 thus illustrates that there is a delay 317 between the clock signal of the slave box 310 and the clock signal 308 of the master box 300. The clock signal 311 illustrates the clock signal that is actually generated by the slave box 310. The clock signal 311 is in sync with the clock signal 308 because of the adjustment made by the clock adjuster 304.

If the delay is not accounted for, the delay will grow as additional delay is introduced for each slave box in a particular box configuration. FIG. 3 illustrates that the time delay 327 of the clock signal 329 that would accumulate in the domain if the clock signal 329 was not adjusted. The slave box 310 also includes a clock adjuster 314 such that this delay is reduced or eliminated. Thus, the clock signal 321, 311, and 308 are synchronized in this manner.

Thus, the slave clocks 312 and 322 are effectively disabled or tri-stated and the time stamp counters are all driven from the master clock 302. Because the clock multipliers 306, 316, and 326 are also driven by the master clock 302, the time stamp counters are all substantially synchronized. Often, the delay introduced into the master clock signal by the clock adjusters is not equal to the actual delay. However, the time stamp counters of the ports in a domain are within useful bounds of precision even if not perfectly synchronized. In other words, the time stamp counters are sufficiently synchronized such that the time stamp values obtained from the time stamp counters provide useful information that may relate to receiving, monitoring, and/or transmitting data.

Figure 4:
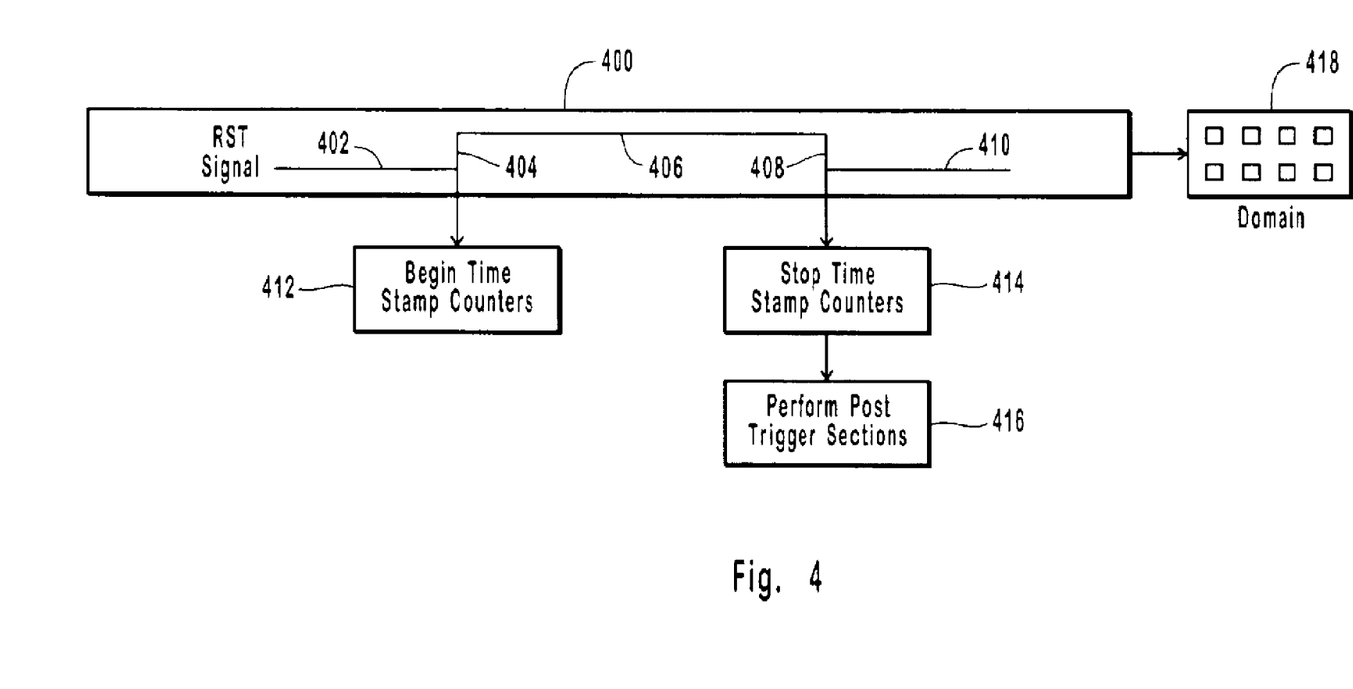
FIG. 4 illustrates how the ports in a domain are started, stopped, and triggered in a substantially synchronous manner.

FIG. 4 illustrates an example of how the RST signal functions in a domain. This example describes a serial protocol, but the present invention can be implemented using other signal protocols. The RST signal that originates on a master box is delivered to each port in a particular domain 418. The serial protocol used for the RST signal can also be implemented when the RST signal is implemented as two separate signals as previously described.

Each domain will have control signals for that domain, although the control signals can be carried on the same physical wire. For example, a serial protocol can be used where certain bit times correspond to particular domains. For example, the RST signal may be high for 6 clock cycles, then a low, followed by four bits of data, a low, four more bits of data, a low, four bits of data, a low, four bits of data and a low. The TO signal can be similarly defined.

For the RST signal, the first 4 bits represent the RST signal for the domains 3, 2, 1, and 0. The second set of 4 bits represent the RST signal for the domains 7, 6, 5, and The third set of 4 bits represents the SR signal for the domains 3, 2, 1, and 0. The fourth set of 4 bits represents the SR signal for the domains 7, 6, 5, and 4. Note than the signal is of course formulated for a particular hardware configuration as previously mentioned. The TO signal is similarly defined where the first four bits represent the TO signal for the domains 3, 2, 1, and 0, the second four bits represent the TO signal for the domains 7, 6, 5, and 4. The third set of four bits represents the SR for domains 3, 2, 1, and 0, and the fourth set of four bits represents the SR for domains 7, 6, 5, and 4.

These signals are repeatedly sent by the master box and received by the slave boxes. This serial protocol also ensures that the only time 6 high bits occur is when the cycle is beginning. In this example, 26 clock cycles are used to synchronize the bit stream. If the master clock operates at 25 MHz, then each cycle is about 1.04 microseconds. This enables a TO signal generated by a port to be received in the next cycle.

When the FPGA receives the RST signal 400, the appropriate bits that correspond to all of the domains that have ports on that box are checked by the FPGA of the box to determine if the RST signal 400 is high or low for those domains. For clarity, the RST signal 400 is discussed in terms of a single domain. The RST signal 400 is a logic signal that is initially low 402. On the rising edge 404 of the RST signal 400, or when the RST signal 400 goes high for the domain 418, the time stamp counters for the ports in the domain begin to count (412). As previously stated, each port usually has an associated time stamp counter that is often set to zero when the RST signal 400 is low. Also, the ports are synchronized because of how the clock signal is distributed to the boxes as described above.

The time stamp counters thus begin to count when the RST signal 400 goes high and continue to count as long as the RST signal 400 remains high. The RST signal 400 is thus repeatedly sent and is repeatedly checked by each slave box in order to determine whether the RST signal is high or low.

When the RST signal 400 goes from high to low (falling edge 408), the FPGAs on the slave boxes cause the time stamp counters for the ports on the corresponding boxes that are in the domain 418 to stop (414). When the time stamp counters stop, post trigger actions are performed (416) for the affected ports. Exemplary post trigger actions include, but are not limited to, immediately ceasing to perform actions, capture a predetermined amount of data within a buffer, and the like.

One reason that the RST signal 400 will go low is that a particular port within the domain 418 will experience a trigger event. The trigger events can be defined in software and/or in hardware. When a trigger event occurs, the port generates the TO signal which is received, for example, by the FPGA of the relevant box. The FPGA that receives the TO signal from the triggering port causes the RST signal 400 to go low, which causes the time stamp counters on the remaining ports in the domain to stop and perform post trigger actions. Because the port that generated the TO signal stops its time stamp counter before the other ports recognize that the RST signal as been pulled low, the port that triggered can be identified by examining the time stamp values obtained from the time stamp counters. Typically, the port with the lowest time stamp value is the port that generated the TO signal that causes the RST signal 400 to go low.

If more than one port within a domain triggers at the same time, both ports will trigger and stop the time stamp counters of the other ports in the domain. Because the time stamp counters are substantially synchronized, the data captured by the ports can be analyzed. Determining which port triggered first depends on the granularity of the synchronization as previously described.

Thus, time stamp counters and the time stamp values can be synchronized across ports even if the ports use different protocols and/or technologies. The master clock is distributed in a cascaded fashion from a master box to a slave box. Each slave box distributes the clock signal to subsequent slave boxes and each box adjusts the clock signal to account for delays that occur. The master clock is thus effectively driving the clock multiplier at each box and is therefore driving the time stamp counters of all ports in a synchronized fashion as described.

Using a similar scheme, the RST signal can be similarly distributed across boxes such that the time stamp counters are started, stopped and triggered in a synchronous manner. Because the RST and TO signals are effectively clocked using the serial protocol described above, the RST and TO signals can be set back or adjusted to account for delays just like the master clock signal is set back. When a trigger event occurs at a port within a domain, the remaining ports in the domain can be triggered in a synchronous manner.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system that includes a plurality of boxes, wherein each box includes a plurality of blades and each blade has one or more ports, wherein a domain includes a plurality of ports that are selected from the plurality of boxes, a method for synchronizing a time stamp counter of each port in the domain, the method comprising:
   generating a clock signal at a master box;
   adjusting the clock signal to account for a delay;
   sending the adjusted clock signal to a slave box such that the delay in the clock signal is reduced on the slave box and the clock signal on the slave box is substantially synchronized with the clock signal on the master box;
   multiplying the clock signal on the master box and the adjusted clock signal at the slave box; and
   driving time stamp counters for each port in each domain on the master box with the multiplied clock signal and for each port in each domain on the slave box with the adjusted and multiplied clock signal such that the time stamp counters for each port in each domain are substantially synchronized.

2. A method as defined in claim 1, further comprising adjusting the adjusted clock signal at subsequent slave boxes, wherein a distance between the master box and subsequent slave boxes or a distance between slave boxes does not prevent the time stamp counters from being substantially synchronized.

3. A method as defined in claim 1, wherein sending the adjusted clock signal to a slave box such that the delay in the clock signal is reduced on the slave box further comprises sending control signals from the master box to the slave box, wherein the control signals include one or more of:
   a run/stop/trigger signal;
   a trigger out signal; and
   a state reset signal.

4. A method as defined in claim 3, further comprising adjusting, at the slave box, one or more of:
   the run/stop/trigger signal; and
   the trigger out signal.

5. A method as defined in claim 1, further comprising starting the time stamp counters of ports in the domain by asserting the run/stop/trigger signal.

6. A method as defined in claim 1, further comprising stopping the time stamp counters of ports in the domain by de-asserting the run/stop/trigger signal.

7. A method as defined in claim 1, further comprising:
   detecting a trigger event at a particular port, wherein the trigger out signal is asserted; and
   stopping the time stamp counters of other ports in the domain with the run/stop/trigger signal.

8. A method as defined in claim 1, further comprising identifying which port asserted the trigger out signal by comparing time stamp values of ports within the domain.

9. A method as defined in claim 1, wherein sending the adjusted clock signal to a slave box such that the delay in the clock signal is reduced on the slave box further comprises sending control signals from the master box to the slave box, wherein the control signals include one or more of:
   a run/stop signal;
   a trigger signal;
   a trigger out signal; and
   a state reset signal.

10. A method as defined in claim 9, further comprising:
    detecting a trigger event at a particular port, wherein the trigger out signal is asserted; and
    stopping the time stamp counters of other ports in the domain with the run/stop signal.

11. In a system that includes a plurality of ports on one or more boxes, a method for synchronizing time stamp counters of each port in a domain, wherein the domain includes at least one port protocol and wherein some of the ports operate at a frequency that is different than other ports in the domain, the method comprising:
    identifying a master box and at least one slave box, wherein the master box and the at least one slave box are cascaded together;
    disabling clock signals of the at least one slave box, wherein a clock signal from the master box is distributed to each slave box;

accounting for a delay in the clock signal at the master box and at each subsequent slave box with a clock adjuster, wherein the clock adjuster causes an output clock signal to precede an input clock signal such that the clock signal from the master box is substantially synchronized at each box;

multiplying the clock signal at the master box and each slave box;

driving time stamp counters of the ports in the domain with the multiplied clock signals of the master box and each slave box; and starting and stopping the time stamp counters of the ports with a control signal such that the time stamp counters are synchronized within a range.

12. A method as defined in claim 11, wherein accounting for a delay in the clock signal at the master box and at each subsequent slave box with a clock adjuster further comprises adjusting one or more control signals.

13. A method as defined in claim 12, wherein adjusting one or more control signals further comprises at least one of:

adjusting a run/stop/trigger signal; and adjusting a trigger out signal.

14. A method as defined in claim 11, further comprising distributing a trigger out signal to ports in the domain when a particular port triggers such that the time stamp counters of the ports in the domain are stopped, wherein the trigger out signal causes the run/stop/trigger signal to change such that the time stamp counters of ports in the domain are stopped at the same time.

15. A method as defined in claim 13, further comprising delivering the one or more control signals using a serial protocol, wherein a field programmable gate array at each box analyzes the serial protocol to identify the one or more control signals for the domain.

16. A method as defined in claim 11, further comprising starting the time stamp counters of the ports in the domain by asserting the control signal, wherein the control signal is a run/stop/trigger signal.

17. A method as defined in claim 16, further comprising stopping the time stamp counters of the ports in the domain by de-asserting the run/stop/trigger signal.

18. A method as defined in claim 11, further comprising identifying ports in the domain.

19. A method as defined in claim 12, wherein adjusting one or more control signals further comprises at least one of:

adjusting a run/stop/signal;

adjusting a trigger signal; and adjusting a trigger out signal.

20. A method as defined in claim 19, further comprising distributing a trigger out signal to ports in the domain when a particular port triggers such that the time stamp counters of the ports in the domain are stopped, wherein the trigger out signal causes the run/stop signal to change such that the time stamp counters of ports in the domain are stopped at the same time.

21. A method as defined in claim 11, further comprising starting the time stamp counters of the ports in the domain by asserting the control signal, wherein the control signal is a run/stop signal.

22. A method as defined in claim 19, further comprising stopping the time stamp counters of the ports in the domain by de-asserting the run/stop signal.

* * * * *